United States Patent
Cowan et al.

(10) Patent No.: US 12,043,716 B2
(45) Date of Patent: Jul. 23, 2024

(54) METHODS AND COMPOSITIONS FOR ADHERING POLYSULFIDES OR POLYTHIOETHERS TO THERMOPLASTIC OR THERMOSET MATERIALS

(71) Applicant: The Boeing Company, Chicago, IL (US)

(72) Inventors: Daniel James Cowan, Ladson, SC (US); Bart Stevens, North Charleston, SC (US); Jason Alan Bolles, Seattle, WA (US); Robert Frederick Rivers, Ladson, SC (US)

(73) Assignee: The Boeing Company, Arlington, VA (US)

( * ) Notice: Subject to any disclaimer, the term of this patent is extended or adjusted under 35 U.S.C. 154(b) by 954 days.

(21) Appl. No.: 16/540,405

(22) Filed: Aug. 14, 2019

(65) Prior Publication Data

US 2021/0047488 A1 Feb. 18, 2021

(51) Int. Cl.
| | |
|---|---|
| *C08J 7/04* | (2020.01) |
| *B05D 3/00* | (2006.01) |
| *B05D 3/10* | (2006.01) |
| *C09D 5/00* | (2006.01) |
| *C09D 181/04* | (2006.01) |

(52) U.S. Cl.
CPC ............ *C08J 7/042* (2013.01); *B05D 3/002* (2013.01); *B05D 3/101* (2013.01); *C09D 5/002* (2013.01); *C09D 181/04* (2013.01); *C08J 2363/00* (2013.01); *C08J 2375/04* (2013.01); *C08J 2377/00* (2013.01); *C08J 2481/04* (2013.01)

(58) Field of Classification Search
CPC .... C08J 7/042; C08J 2363/00; C08J 2375/04; C08J 2481/04; C08J 2377/00; B05D 3/002; B05D 3/101; C09D 5/002; C09D 181/04
See application file for complete search history.

(56) References Cited

U.S. PATENT DOCUMENTS

2008/0050598 A1* 2/2008 Bateman .............. B05D 3/107
428/537.1

OTHER PUBLICATIONS

Lambourne, R. Strivens, T.A.. (1999). Paint and Surface Coatings—Theory and Practice (2nd Edition). Woodhead Publishing. Retrieved from https://app.knovel.com/hotlink/toc/id:kpPSCTPE03/paint-surface-coatings/paint-surface-coatings (Year: 1999).*
Koleske, Joseph V.. (1995). Paint and Coating Testing Manual (14th Edition): (MNL 17)—13.2 Definitions. ASTM International. Retrieved from https://app.knovel.com/hotlink/pdf/id:kt004FR3U5/paint-coating-testing/definitions (Year: 1995).*
A.M. Usmani et al. Interfacial considerations in polysulfide sealant bonding. Rubber Chemistry and Technology. Vol. 54, pp. 1081-1095. (Year: 1981).*
L.J. Clark, et al. Use of Permapol P3.1 polymers and epoxy resins in the formulation of aerospace sealants. International Journal of Adhesion & Adhesives 23 (2003) 343-348. (Year: 2003).*
W.-H. Chang et al. Advances in Polyurethane Coatings (1969 to Early 1972). Ind. Eng. Chem. Prod. Res. Develop., vol. 12, No. 4, 1973. pp. 278-288 (Year: 1973).*

* cited by examiner

*Primary Examiner* — Randy P Gulakowski
*Assistant Examiner* — Christina H. W. Rosebach
(74) *Attorney, Agent, or Firm* — McDonnell Boehnen Hulbert & Berghoff LLP

(57) ABSTRACT

Disclosed herein are methods and compositions for preparing a surface comprising thermoplastic or thermoset material to receive a polysulfide or polythioether sealant or coating, the method comprising applying to the surface an activating composition consisting of a tetraalkoxide of a Group 4 metal, a complex of an alkoxide of a Group 4 metal, or a combination thereof.

26 Claims, No Drawings

METHODS AND COMPOSITIONS FOR ADHERING POLYSULFIDES OR POLYTHIOETHERS TO THERMOPLASTIC OR THERMOSET MATERIALS

FIELD OF THE DISCLOSURE

The present disclosure relates to methods for adhering polysulfide and/or polythioether coatings to thermoplastic or thermoset materials.

BACKGROUND

The automotive, aerospace, electronics and medical industries make routine use of various thermoplastic and thermoset materials. In addition, sealing of joints or gaps formed by connecting thermoplastic or thermoset components with other components made of the same or different materials, e.g., metal, glass, and carbon fiber, is necessary in many industries. For example, aircraft manufacturing requires sealing joints and gaps in fuel tank and wing assemblies. Various polysulfide and polythioether sealants, including polysulfide rubbers, are particularly useful for sealing such joints and gaps. Polysulfide and polythioether compounds are also useful for corrosion inhibition, aerosmoothing, electrical insulation, windshield/canopy sealing, priming and topcoating.

Adhesion of polysulfides and/or polythioethers to thermoplastic materials or thermoset materials is often inadequate; methods for developing sufficient adhesion of the polysulfide or polythioether to a thermoplastic or thermoset substrate or surface have proved elusive. Current chemical and mechanical approaches have limitations. Mechanical abrasion is labor intensive, the reproducibility is variable, and it is ergonomically costly due to the highly repetitive and vibratory nature of the work. As such there is a pressing need for the development of a surface treatment to improve the adhesion of aged or inert industrial organic coatings towards additional coating layers or other entities, for example, adhesives, sealants, fillers, decals and the like.

Current strategies do not adequately address the need for a surface treatment to improve the adhesion of polysulfide and polythioether sealants to thermoplastic or thermoset materials. Thus, there remains a need for compositions and methods to adequately adhere polysulfide and/or polythioether sealants to thermoplastic material or thermoset materials.

SUMMARY OF THE DISCLOSURE

This disclosure provides a convenient solution to the problems identified above. It has unexpectedly been discovered that adhesion of a polysulfide or polythioether sealant to a thermoplastic or thermoset material can be improved compared to existing methods by treating or applying to a surface comprising thermoplastic material or thermoset material a composition consisting of a tetraalkoxide of a Group 4 metal, a complex of an alkoxide of a Group 4 metal, or a combination thereof.

In a broad aspect, this disclosure provides a method for preparing a surface comprising thermoplastic material or thermoset material to receive a polysulfide sealant or a polythioether sealant, the method comprising applying to the surface an activating composition consisting of a tetraalkoxide of a Group 4 metal, a complex of an alkoxide of a Group 4 metal, or a combination thereof.

In another aspect, this disclosure provides a method for coating a surface comprising a thermoplastic material or thermoset material with a polysulfide sealant or a polythioether sealant, the method comprising applying to the surface an activating composition consisting of a tetraalkoxide of a Group 4 metal, a complex of an alkoxide of a Group 4 metal, or a combination thereof, and applying a polysulfide sealant to the surface carrying the activating composition.

In another aspect, this disclosure provides a method for adhering a polysulfide sealant or a polythioether sealant to a surface comprising a thermoplastic or thermoset material, the method comprising applying to the surface an activating composition consisting of a tetraalkoxide of a Group 4 metal, a complex of an alkoxide of a Group 4 metal, or a combination thereof.

In certain embodiments, the Group 4 metal is zirconium and the tetraalkoxide is dissolved in an alcohol corresponding to the alkoxide at a weight percentage of about 12-40, based on the total weight of the composition.

The methods and compositions disclosed herein activate thermoplastic or thermoset material to improve adhesion between the material and polysulfide and polythioether sealants. The disclosed methods and compositions do not compromise the integrity of the thermoplastic or thermoset material or that of the polysulfide or polythioether coating.

The compositions of this disclosure are considered "mild", i.e., they are not known to be excessively corrosive, acidic, basic or toxic and are applicable for use in highly regulated industrial environments. One example of such an environment is a commercial aircraft manufacturing facility. Additionally the compositions disclosed herein do not adversely affect the bulk aircraft coatings, or underlying coatings, such as primers or selectively strippable coatings, or underlying substrates, such as aluminum and composite.

In another aspect, this disclosure provides a thermoplastic or thermoset substrate coated with an organic polysulfide or polythioether, wherein the surface of the thermoplastic or thermoset substrate has been modified by contact with an activating agent, i.e., a tetraalkoxide of a Group 4 metal, a complex of an alkoxide of a Group 4 metal, or a combination thereof.

DETAILED DESCRIPTION

As noted above, this disclosure provides a convenient solution to the problems encountered previously in coating thermoplastic substrates with polysulfides. Improved adhesion of polysulfides to thermoplastic materials can be conveniently achieved by preparing a surface comprising thermoplastic material or a thermoset material to receive a polysulfide sealant or a polythioether sealant. The preparing comprises applying to the surface an activating composition consisting of a tetraalkoxide of a Group 4 metal, a complex of an alkoxide of a Group 4 metal, or a combination thereof.

The methods of this disclosure include methods for coating a surface comprising a thermoplastic material or a thermoset material with a polysulfide sealant or a polythioether sealant. The coating methods comprise
 applying to the surface an activating composition consisting of a tetraalkoxide of a Group 4 metal, a complex of an alkoxide of a Group 4 metal, or a combination thereof, and
 applying a polysulfide sealant to the surface carrying the activating composition.

Further, this disclosure provides methods for adhering a polysulfide sealant or polythioether sealant to a surface comprising a thermoplastic material or a thermoset material.

These methods comprise applying to the surface an activating composition consisting of a tetraalkoxide of a Group 4 metal, a complex of an alkoxide of a Group 4 metal, or a combination thereof.

The methods of this disclosure involve activating a thermoplastic material or thermoset material (which may be a coating or layer of the thermoplastic or thermoset on another material) to enhance the adhesive properties of at least the surface of the thermoplastic material or thermoset material towards polysulfides, polysulfide sealants, polythioethers and polythioether sealants. The term "activating" is used in this context to mean that adhesion between the thermoplastic or thermoset material and a polysulfide(s) or polythioether(s) is improved compared to adhesion between those materials in the absence of the activating composition.

The activating compositions of this disclosure, i.e., the compositions consisting of a tetraalkoxide of a Group 4 metal, a complex of an alkoxide of a Group 4 metal, or a combination thereof, typically as a solution of the metal alkoxide in an alcohol, are not conventional coatings such as a primer coating or tie-coat, but are believed to function by chemically modifying the surface of the thermoplastic or thermoset to make it more receptive to forming adhesive interactions with the polysulfide.

The compositions disclosed herein consist of a tetraalkoxide of a Group 4 metal, a complex of an alkoxide of a Group 4 metal, or a combination thereof typically dissolved in an alcohol corresponding to the alkoxide.

The methods disclosed herein do not require treatment with or application of any other compositions. The methods of this disclosure avoid treatment with or application of other compositions for adhering the polysulfide or polythioether to the thermoplastic material or thermoset material.

The methods of this disclosure optionally include mechanical treatment of the thermoplastic material or thermoset material to prepare it for application of a polysulfide or polythioether, the methods avoid application of liquid compositions containing ingredients other than those of the activating composition, i.e., the Group 4 metal, complex of an alkoxide of a Group 4 metal, or combination thereof, and an alcohol corresponding to the alkoxide.

Without wishing to be bound by any particular theory, it is believed that the activating composition to the thermoplastic material or thermoset material functions to activate thermoplastic or thermoset material at its surface to generate a layer of activated thermoplastic material or activated thermoset material.

Suitable Group 4 metals for use in the methods and compositions disclosed herein include titanium and zirconium.

In aspects of the methods and compositions disclosed herein, the tetraalkoxide of a Group 4 metal, complex of an alkoxide of a Group 4 metal, or combination thereof, is an alkyltitanate, alkyltitanate complex, alkylzirconate, alkylzirconate complex, or a combination thereof.

In other aspects of the methods and compositions disclosed herein, the Group 4 metal is zirconium and the tetraalkoxide is dissolved in an alcohol corresponding to the alkoxide.

In yet other aspects of this disclosure, the activating composition consists of a solution of tetra-n-propylzirconate in n-propanol or of tetra-isopropylzirconate in isopropanol.

In certain embodiments, the activating compositions disclosed herein consist of about 12 to about 40 weight % of a tetraalkoxide of the Group 4 metal, a complex of a tetraalkoxide of a Group 4 metal, or a combination thereof, dissolved in an alcohol, which can be an alcohol corresponding to the alkoxide, based on the total weight of the composition, i.e., the combined weight of the tetraalkoxide of the Group 4 metal, complex or combination thereof and the alcohol. In other embodiments, the concentration of the alkoxide in the alcohol is from about 15% to about 40%, or about 15 to about 35%, or about 15 to about 30%, or about 15 to about 25%, or about 20 to about 35%, or about 20 to about 30%, or about 20 to about 25% by weight of the composition.

In certain embodiments, the tetraalkoxide of a Group 4 metal, complex of an alkoxide of a Group 4 metal, or combination thereof is an alkyltitanate, alkyltitanate complex, alkylzirconate, alkylzirconate complex, or a combination thereof, weherein the tetraalkoxide, complex, or combination is dissolved in an alcohol at a weight percentage of from about 12 to about 40, based on the weight of the composition. In other embodiments, the concentration of the alkyltitanate, alkyltitanate complex, alkylzirconate, alkylzirconate complex, or combination thereof in the alcohol is from about 15% to about 40%, or about 15 to about 35%, or about 15 to about 30%, or about 15 to about 25%, or about 20 to about 35%, or about 20 to about 30%, or about 20 to about 25% by weight of the composition.

In certain embodiments, the Group 4 metal is zirconium and the tetraalkoxide is dissolved in an alcohol corresponding to the alkoxide at a weight percentage of about 12 to about 40 percent based on the weight of the total composition. In other embodiments, the concentration of the zirconium tetraalkoxide in the alcohol is from about 15% to about 40%, or about 15 to about 35%, or about 15 to about 30%, or about 15 to about 25%, or about 20 to about 35%, or about 20 to about 30%, or about 20 to about 25% by weight based on the weight of the composition.

In certain examples, the Group 4 metal alkoxide is zirconium tetra-n-propoxide or zirconium tetra-isopropoxide, and the metal alkoxide is dissolved in an alcohol corresponding to the alkoxide at a weight percentage of from about 12 to about 40 percent based on the weight of the composition. In other embodiments, the concentration of the zirconium tetraalkoxide in the alcohol is from about 12% to about 35%, or about 15 to about 35%, or about 15 to about 30%, or about 15 to about 25%, or about 18 to about 25%, or about 20 to about 35%, or about 20 to about 30%, or about 20 to about 25% by weight, based on the weight of the composition.

In an aspect, the activating composition is a solution consisting of from about 12 to about 40 weight percent, about 12 to about 30 weight percent, about 12 to about 25 weight percent, about 15 to about 30 weight percent, about 15 to about 25 weight percent, about 18 to about 25 weight percent, or from about 20 to about 25 weight percent of tetra-n-propylzirconate in n-propanol based on the weight of composition.

In aspects of this disclosure, the activating composition comprises a solution of tetra-n-propyltitanate in n-propanol or of tetra-isopropyltitanate in isopropanol.

In another aspect, the activating composition is a solution consisting of from about 12 to about 40 weight percent, about 12 to about 30 weight percent, about 12 to about 25 weight percent, about 15 to about 30 weight percent, about 15 to about 25 weight percent, about 18 to about 25 weight percent, or from about 20 to about 25 weight percent of tetra-n-propyltitanate in n-propanol based on the weight of composition.

A wide variety of thermoplastic materials is suitable for use in the methods and compositions disclosed herein.

Representative examples of suitable thermoplastic materials include polyolefins including polyethylene and polypropylene, polycarbonate, polyacrylates such as polymethylmethacrylate/acrylate, polyamides, polyetherimides, polyaryletherketones, epoxies, thermoplastic polyurethanes, thermoplastic epoxies, polyimides, polyamide-imides, polyether imides, and perfluoro-alkoxy alkanes.

Suitable polyamides for use as the thermoplastic material include aliphatic and semi-aromatic polyamides. Particularly useful polyamides include polycondensation products of hexamethylenediamine and adipic acid (e.g., Nylon 6/6) and hexamethylenediamine and 1,12-dodecanedioic acid (e.g., Nylon 6/12). Another example of a suitable amide thermoplastic material is polylaurolactam, i.e., Nylon 12. Examples of suitable polyamides are the Trogamid® polyamides.

Suitable polyether imides include polymers that can be represented by the following formula:

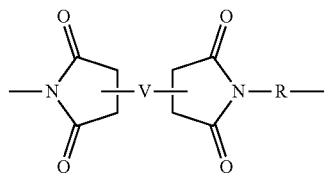

wherein
V is alkyl, alkenyl, alkynyl, aryl, heteroaryl, cycloalkyl, or heterocyclyl; and
R is a substituted or unsubstituted difunctional organic moiety such as aryl (e.g., 1,4-phenylene, 1,3-phenylene, and the like), alkenyl, heteroaryl, cycloalkyl, or heterocyclyl, or difunctional groups of the general formula:

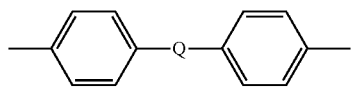

in which Q is a difunctional group such as —C$_y$H$_2$—, —CO—, —SO$_2$—, —O—, —S—, and the like, and y is an integer of from 1 to 5, and in some embodiments, from 2 to 3.

A particular example of polyether imide has the following structure:

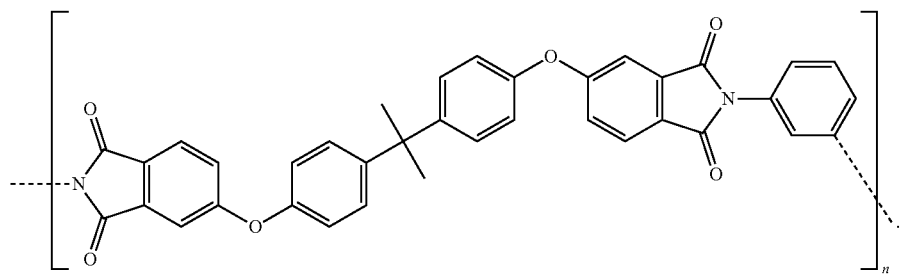

wherein n is an integer selected to produce a polymer having a weight average molecular weight (Mw) of about 10,000 to about 150,000. Examples of such polyetherimides include, but are not limited to ULTEM® 1000 (weight average molecular weight (Mw) 54,000), ULTEM® 1010 (Mw 47,000), and ULTEM®1040 (Mw 34,000-35,000).

Another example of a polyether imide is Ultem® 2300, a glass reinforced polyether imide commercially available from Quadrant Engineering Plastic Products.

Suitable polyamide imides have the following structure:

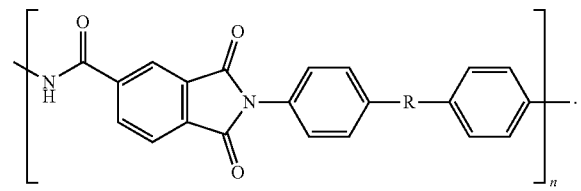

wherein
R represents a bond, C$_1$-C$_6$ alkylene, —C(O)—, —O—, —S—, —S(O)—, or —S(O)$_2$, and
n is an integer selected to typically produce a polymer having a weight average molecular weight (Mw) of about 3,000 to about 13,000.

An example of a polyamide imide for use herein is Torlon® 4203L, an unreinforced polyamide imide commercially available from Solvay.

Polyaryletherketones are also useful herein as a suitable thermoplastic material. In one particular embodiment, for example, the polyaryletherketone is a homopolymer or copolymer containing a unit of the following general the formula —Ar-0-Ar—C(=0)-, wherein Ar is an aryl group having from about 4 to about 10 carbons, or from about 5 to about 8 carbons or about 6 carbons such as pentyl, phenyl and the like. Polyaryletherketones include aryl groups such as phenyl that are linked via ether, carbonyl, sulfone, or imide groups and include the following:

Poly (ether ketone), i.e. PEK, a polymer consisting essentially of the repeat unit: —Ar-0-Ar—C(=0)-("Ar" being defined as in the above paragraph herein and in the following description of polyaryletherketones).

Poly (ether ketone ketone), i.e. PEKK, a polymer consisting essentially of the repeat unit: —Ar-0-Ar—C(=0)-Ar—C(=0)-.

Poly (ether ether ketone), i.e. PEEK, a polymer consisting essentially of the repeat unit: —Ar-0-Ar-0-Ar—C(=0)-.

Poly (ether ether ketone ketone), i.e. PEEKK, a polymer consisting essentially of the repeat unit: —Ar-0-Ar-0-Ar—C(=0)-Ar—C(=0)-.

Poly (ether ketone ether ketone ketone), i.e. PEKEKK, a polymer consisting essentially of the repeat unit: —Ar-0-Ar—C(=0)-Ar-0-Ar—C(=0)-Ar—C(=0)-.

A particular example of a polyaryletherketone is a PEEK thermoplastic carbon fiber tape and woven fabric meeting Boeing Material Specification BMS8-422.

A particular example of a polyaryletherketone is a carbon fiber reinforced PEKK thermoplastic prepreg meeting Boeing Material Specification BMS8-399.

Another particular example of a polyaryletherketone is a semi-impregnated PEKK thermoplastic powder-coated fiberglass fabric meeting Boeing Material Specification BMS8-429.

Suitable polyimides include polymers having the formula:

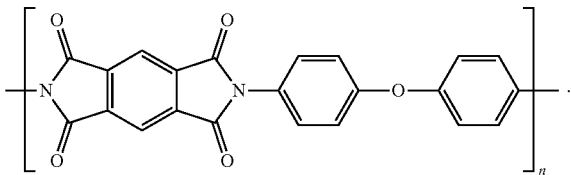

wherein n is an integer of from about 25 to about 275.

An particularly suitable polyimide is poly (4,4'-oxydiphenylene-pyromellitimide). Suitable polyimides include Kapton® films commercially available from DuPont.

Other suitable thermoplastic materials are the fluoropolymers known as perfluoroalkoxy alkanes. These materials are copolymers of tetrafluoroethylene ($C_2F_4$) and perfluoroethers ($C_2F_3OR^f$, where $R^1$ is a perfluorinated group such as trifluoromethyl ($CF_3$)).

Yet other thermoplastics suitable for use with the activating compositions herein are polyoxymethylenes including, for example a 20% polytetrafluoroethylene fiber filled polyoxymethylene commercially available as Delrin® 500 from Emco Industrial Plastics.

A wide variety of thermoset materials is suitable for use in the methods and compositions disclosed herein. Suitable thermoset materials include epoxies, phenol-formaldehyde (phenolic) polymers, thermosetting polyesters, thermosetting polyurethanes, thermoset polyurea, urea-formaldehyde polymers, cyanoacrylate polymers, nitrile rubbers, styrene butadiene rubbers, isoprene rubbers, chloroprene rubbers, butadiene rubber, vinyl esters, bismaleimide (BMI) polymers, cyanate esters, silicone rubbers, and thermoset polyimides. A representative epoxy is Loctite EA 9394 AERO (Hysol EA 9394) which meets Boeing Material Specification BMS8-338, and is commercially available from Henkel. Other examples of suitable epoxies are Lytex® epoxies, which are carbon fiber or glass fiber filled thermosetc epoxies.

A thermoplastic material or thermoset material can include one or more thermoplastic or thermoset polymers in conjunction with additives as are generally known in the art including, without limitation, impact modifiers, fillers, antimicrobials, lubricants, pigments or other colorants, antioxidants, stabilizers, surfactants, flow promoters, solid solvents, electrically conductive additives, and other materials added to enhance properties and processability. Such optional materials may be employed in the polymer composition in conventional amounts and according to conventional processing techniques.

In one embodiment, a fibrous filler can be included in the thermoplastic composition or thermoset. A fibrous filler may include one or more fiber types including, without limitation, polymer fibers, glass fibers, carbon fibers, metal fibers, natural fibers such as jute, bamboo, etc., basalt fibers, and so forth, or a combination of fiber types. For instance, the fibers may be chopped fibers, continuous fibers, or fiber rovings.

Fiber sizes can vary as is known in the art. In one embodiment, the fibers can have an initial length of from about 3 mm to about 5 mm. In another embodiment, for instance when considering a thermoplastic tape or tow, the fibers can be continuous fibers. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm. The fiber diameter can be measured by known methods such as by laser diffraction.

As used herein, the term "roving" generally refers to a bundle of individual fibers. The fibers contained within the roving can be twisted or can be straight. The number of fibers contained in each roving can be constant or vary from roving to roving. Typically, a roving contains from about 1,000 fibers to about 100,000 individual fibers, and in some embodiments, from about 5,000 to about 50,000 fibers.

As used herein, the term "tow" generally refers to a composite including continuous fibers impregnated in a polymeric composition. For instance, one or more rovings can be embedded in a thermoplastic or a thermoset composition to form a tow.

Subsequent to treatment of the thermoplastic or thermoset substrate with an activating composition as disclosed herein, and once the treated substrate is dried, a polysulfide or polythioether, typically a polysulfide or polythioether sealant, is applied to the dry, treated substrate. Additional mechanical steps can be employed after treatment with the activating composition as necessary and if desired to further improve adhesion of the polysulfide to the substrate.

In some embodiments, the activating composition is allowed to dry on the thermoplastic or thermoset material material before the sealant is applied to the thermoplastic or thermoset material material. Drying times will vary depending on application and atmospheric conditions, but typically range from less than a minute (i.e., between 1, 2, 3, 4, 5, 6, 7, 8, 9, or 10 seconds and about 60 seconds) up to about 48 hours. Suitable drying times are from about 5 minutes to about 2 hours, or from about 10 minutes to about 30 minutes.

The activating composition may be applied via any method known to those skilled in the art such as but not limited to spray, brush, dip, knife, blade, hose, roller, wipe, curtain, flood, flow, mist, pipette or combinations thereof. Application by spray or brush is typical.

A single application of the activating composition is typically sufficient to provide an acceptable level of adhesion between the thermoplastic or thermoset and the polysulfide or polythioether. Applying a quantity of activating composition that completely wets the surface of the thermoplastic is typically sufficient. By way of example, a sufficient quantity of the activating agent can be applied to the thermoplastic using a spray gun, such as a HVLP (high volume, low pressure) spray gun, at from about 1-2 m/m².

Multiple applications are normally unnecessary but, in certain situations, multiple applications of the activating composition to the thermoplastic material may be required.

The methods disclosed herein may be conducted at ambient temperatures or alternatively at higher temperatures if desirable. The activating composition may be applied to small or large areas, to sections of larger parts, components or full infrastructure such as infrastructure associated with the aerospace (e.g. aircraft), automotive (e.g. vehicles), marine (e.g. ships), transportation (e.g. trains), military (e.g.

helicopter, missile) or construction industries (e.g. buildings, factories, floors). The surface may have simple or complex geometry or may be at any orientation.

In other aspects, the disclosure provides a device comprising a surface comprising a thermoplastic material or thermoset material, a coating on the surface, and a layer of at least one polysulfide or polythioether covering the coating, wherein the coating consists of a layer of an activated thermoplastic or thermoset material, wherein the layer of activated material has been activated by an activating composition consisting of a tetraalkoxide of a Group 4 metal, a complex of an alkoxide of a Group 4 metal, or a combination thereof. The layer of the activating composition typically does not have a readily measurable thickness.

Particular examples of devices according to this disclosure are those wherein the Group 4 metal is titanium or zirconium. Other devices of this disclosure are those wherein the tetraalkoxide of a Group 4 metal, a complex of an alkoxide of a Group 4 metal, or combination thereof is an alkyltitanate, alkyltitanate complex, alkylzirconate, alkylzirconate complex, or a combination thereof.

Suitable device of this disclosure are those wherein the polysulfide or polythioether layer has a thickness of from about 0.2 mm to about 10 mm, or from about 0.5 to about 8 mm, or from about 1 to about 5 mm.

The terms "polysulfide", "organic polysulfide", "polysulfide rubber", and "polysulfide sealant" refer to a polymer comprising chains containing sulfur-sulfur linkages connecting short alkylene, alkenylene, and/or alkylene ether units. The polymer chain is typically terminated by reactive mercaptan groups. The terminal mercaptan groups can be used for cross- or interlinking polymer chains. The sulfur content is relatively high, making the polymer a high-density material with a high resistance to hydrocarbons. Polysulfide rubbers are often referred to as elastomeric sealants.

The terms "polythioether" and "polythioether sealant" refer to a polymer comprising chains containing sulfur-carbon linkages connecting short alkylene, alkenylene, and/or alkylene ether units The polymer chains are normally terminated by reactive mercaptan groups. The terminal mercaptan groups can be used for cross- or interlinking polymer chains.

Polysulfides and polythioethers are collectively referred to herein as "organic sulfur containing polymers."

The term "joint" refers to a point at which parts or components of a structure are joined or connected together and held in place, typically by a fastener such as a bolt, screw, or rivet. The parts and components can be metal, such as aluminum or titanium, glass, plastic, or carbon fiber reinforced polymer (CFRP). Normally, gaps exist between the parts at the joint as well as between the parts and the fastener. The term "gap" refers to the area, space, or void between pairs or groups of connected parts and to areas, spaces, and voids between parts and the fasteners. Thus, as used herein, sealing of joints and gaps refers to filing the area, joint or space to prevent fluid, i.e., liquid and gas, communication through the joint or gap. Accordingly, sealant can also be applied over a fastener, e.g., both heads of a rivet or the head and nut of a bolt.

Representative examples of suitable polysulfides and their constituent repeating units are:

| Polysulfide | Repeating unit |
| --- | --- |
| poly(ethylene disulfide) | —(SCH$_2$CH$_2$S)— |
| poly(ethylene tetrasulfide) | —(S$_2$CH$_2$CH$_2$S$_2$)— |
| poly(ethyl ether disulfide) | —(SCH$_2$CH$_2$OCH$_2$CH$_2$S)— |
| poly(ethyl ether tetrasulfide) | —(S$_2$CH$_2$CH$_2$OCH$_2$CH$_2$S$_2$)— |
| poly(ethyl formal disulfide) | —(SCH$_2$CH$_2$OCH$_2$OCH$_2$CH$_2$S)— |
| poly(pentamethylene disulfide) | —(SCH$_2$(CH$_2$)$_3$CH$_2$S)— |
| poly(hexamethylene disulfide) | —(SCH$_2$(CH$_2$)$_4$CH$_2$S)— |
| poly(butyl formal disulfide) | —(SCH$_2$(CH$_2$)$_3$OCH$_2$OCH$_2$(CH$_2$)$_3$S)— |
| poly(butyl ether disulfide) | —(SCH$_2$(CH$_2$)$_3$OCH$_2$(CH$_2$)$_3$S)— |

Another example of a suitable polysulfide rubber is a copolymer of a dihalogenated alkyl- or alkyl ether monomer, a tihaloalkyl, monomer, and sodium disulfide, sodium trisulfide, or sodium tetrasulfide.

Representative polysulfide rubbers include:

| Polymer | Polysulfide rubber | MW (weight average, g/mol) |
| --- | --- | --- |
| 1 | | 1000-6500 |
| 2 | | 1300-3500 |

Polymer 1 can be prepared by using appropriate amounts of a monomer dihalide, e.g. bis(2-chloroethoxy)methane, a co-monomer trihalide, 1,2,4-trichlorobutane, and co-monomer disulfide, trisulfide, or tetrasulfide. In an embodiment, Polymer 1 has about 37-38% by weight of sulfur.

Particular embodiments of Polymer 1 include polysulfide rubbers containing about 37-38% by weight of sulfur and the following characteristics:

|  | Polymer | | | | | | |
| --- | --- | --- | --- | --- | --- | --- | --- |
|  | 1A | 1B | 1C | 1D | 1E | 1F | 1G |
| MW (g/mol) | 3900-4300 | 5000-6500 | 3300-3700 | 3900-4400 | 2100-2600 | 2400-3100 | <1100 |
| SH content (weight %, in grams of SH/grams of polymer) | 1.5-1.7 | 1.0-1.3 | 1.8-2.0 | 1.5-1.7 | 2.5-3.1 | 2.1-2.7 | >5.9 |
| Density (g/cm$^3$) | 1.285 | 1.310 | 1.286 | 1.285 | 1.285 | 1.285 | 1.259 |
| Viscosity (Pa * s) | 38-50 | 80-145 | 41-52 | 38-50 | 10-20 | 10-20 | max. 1.3 |

Particular embodiments of Polymer 2 include polysulfide rubbers containing about 29-30% by weight of sulfur and the following characteristics:

|  | Polymer | | | | |
| --- | --- | --- | --- | --- | --- |
|  | 3A | 3B | 3C | 3D | 3E |
| MW (g/mol) | About 1300 | About 3100 | About 3500 | About 3400 | About 3500 |
| SH content | 4.9-5.4 | 2.0-2.3 | 1.7-2.2 | 1.98 | 1.78-2.0 |
| Density (g/cm$^3$) | 1.18 | 1.18 | 1.18 | 1.18 | 1.18 |

|  | Polymer | | | |
| --- | --- | --- | --- | --- |
|  | 2A | 2B | 2C | 2D |
| MW (g/mol) | 2000 | 4200 | 2400 | 5500 |
| SH content | 3.3 | 1.57 | 3.3 | 1.94 |
| Density (g/cm$^3$) | 1.16 | 1.16 | 1.16 | 1.16 |
| Viscosity (Pa * s) | 5 | 20 | 12.5 | 50 |

Suitable polysulfide rubbers include those of Formula I below:

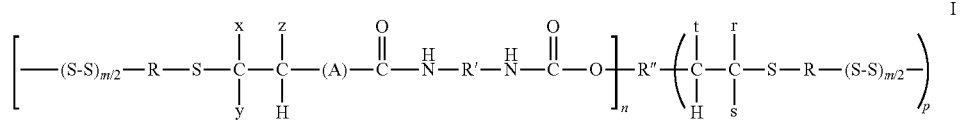

-continued

|  | Polymer | | | | |
| --- | --- | --- | --- | --- | --- |
|  | 3A | 3B | 3C | 3D | 3E |
| Viscosity (Pa * s) | 1.3-1.7 | 10-14 | 9-11 | 14.4 | 8 |

Polymers such as Polymers 1 and 2 are commercially available from AkzoNobel as Thioplast® G type polymers, including Thioplast® MTMS 81 XPHF, Thioplast® MTMS 81 XPHQ, Thioplast® MTMS 81 XPIC, Thioplast® MTMS 81 XPHX, and Thioplast® MTMS81 XPHY.

Other suitable organic sulfur containing polymers include the Permapol® series of polymers, including Permapol® P3 and Permapol® P5 polymers, commercially available from PPG Aerospace/PRC-DeSoto International, Inc.

Particular Permapol® P3 polymers suitable for use as the polythioethers herein contain about 28-30% by weight of sulfur and have the following characteristics:

wherein
each of x, y and z is hydrogen, hydrocarbon, alkoxy, phenoxy, or halogenated
derivatives thereof;
each of r, s and t is hydrogen or lower alkyl;
m is an integer between 1 and 2;
n is an integer between 1 and 4;
p is an integer from 0 to 3;
the sum of n and p is between 2 and 4;
R' is a difunctional organic moiety;
R" is the backbone of a liquid polymer precursor;
R is the grouping of the polymercapto organic compound R—(SH)$_{m+1}$; and
A is the fragment or grouping of an organic olefinic precursor compound having an active hydrogen: -A-C(z)=C(x)(y).

Specific examples of polysulfide rubbers encompassed by Formula I are disclosed in U.S. Pat. No. 3,923,748, the disclosure of which is incorporated herein in its entirety.

Suitable polythioethers are disclosed in U.S. Pat. No. 4,366,307, the disclosure of which is incorporated herein in its entirety. The polythioethers disclosed there have repeating units of Formula II below:

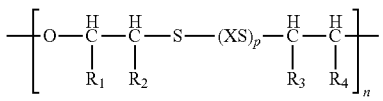

II wherein each of $R_1$, $R_2$, $R_3$ and $R_4$ is hydrogen or lower alkyl providing that a sufficient number of $R_1$, $R_2$, $R_3$ and/or $R_4$ are lower alkyl in said polymeric backbone to render said backbone non-crystallizing;

X is a divalent organic group selected from —$CH_2$—$CH_2$—, —$CH_2$—$CH_2$—$CH_2$—

$CH_2$—, —$CH_2$—$CH_2$—S—$CH_2$—$CH_2$— or —CH—$CH_2$—O—$CH_2$—$CH_2$—;

n is 8 to 200; and p is 0 or 1

Other suitable polythioethers include liquid polythioethers disclosed in U.S. Pat. No. 4,609,762, the disclosure of which is incorporated herein in its entirety. The liquid polythioethers disclosed there have Formula III and IV, shown below:

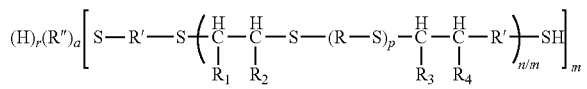

III wherein each of $R_2$ and $R_3$ is hydrogen or lower alkyl;

each of $R_1$ and $R_4$ is lower alkyl,

R is lower alkylene or lower alkylene thioether, p is 0 to 3,

R' is any organic divalent group having no chemically reactive groups such as lower alkylene, lower alkylene thioether, lower alkyl aryl, or lower alkyl heterocyclic, R" is a tri- or tetravalent organic group derived from an organic compound having the formula R"—(Z)$_q$, wherein Z is a primary mercaptan or a secondary hydroxyl located beta to a sulfur atom, q is 3 or 4, and wherein R" has no chemically reactive groups other than the hydroxyl or primary mercaptan, n is from about 8 to 200, r is 0 or 1, a is 0 or 1, the sum of r and a being 1, m is 1, 3, or 4, when m is 1, r is 1 and when m is 3 or 4, a is 1.

As defined in in U.S. Pat. No. 4,609,762, the term "chemically reactive groups" as used in the definitions for Formula III means groups such as, for example, disulfide linkages, ether linkages, halide groups, and ester linkages.

Formula IV is:

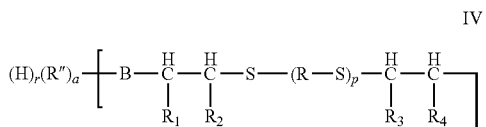

IV

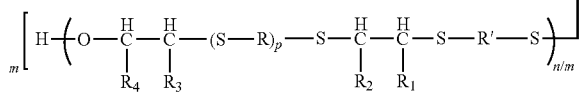

wherein R, a, p, n, m, $R_1$, $R_2$, $R_3$, $R_4$, R', and R" are as defined above for Formula III, and B is oxygen if Z is hydroxyl, and sulfur if Z is mercaptan.

Polysulfide rubbers and polythioethers, methods for their preparation, their characteristics, and their uses are described in Polyethers, Part III, Polyalkylene Sulfides and Other Polythioethers, N. Gaylord, Ed., John Wiley & Sons, Inc. 1962, the disclosure of which is incorporated herein in its entirety.

In certain aspects, the substrate is a thermoplastic material.

In other aspects, the substrate is a thermoset material.

In certain aspects, the methods disclosed herein are for use with and for improving adhesion of a polysulfide on the substrate; i.e., a polysulfide is applied to the thermoset or thermoplastic substrate subsequent to the application of the activating composition.

In certain aspects, the methods disclosed herein are for use with and for improving adhesion of a polythioether to the substrate; i.e., a polythioether is applied to the thermoset or thermoplastic substrate subsequent to the application of the activating composition.

EXAMPLES

The following examples illustrate the invention but are not intended to limit the scope of the invention.

Example 1—Preparation of Zirconium Propoxide Sealant

A solution (S-1) containing 20.8% by weight of zirconium (IV) propoxide in n-propanol is prepared by diluting an approximately 75% by weight solution of the propoxide in n-propanol with additional n-propanol (approximately 285 g) to produce the desired final concentration of the zirconium propoxide.

The solution prepared above is added to an HVLP spray gun and applied to a polyamide substrate (Trogamid® CX7323) in an amount sufficient to wet the substrate (about 1-2 ml/m²) and allowed to dry (about 10-30 minutes). Once the zirconium propoxide is dry, a polysulfide sealant (PPG PR-1776M Class B Low Weight Fuel Tank Sealant, a two-part, manganese dioxide cured Permapol® P-5 modified polysulfide meeting Boeing Material Specification BMS-45) is applied to the substrate surface carrying the dried zirconium propoxide using an extrusion gun or a spatula. The sealant is allowed to cure at room temperature.

Example 2 (Comparative)

A solution (S-2) containing 2.8% by weight of zirconium (IV) propoxide in n-propanol/di(propylene glycol) dimethyl ether is prepared by diluting an approximately 75% by weight solution of the propoxide in n-propanol with di(propylene glycol) dimethyl ether (approximately 2575 g) to produce the desired concentration of the zirconium propoxide. The resulting solution contains approximately 96.25% by weight of di(propylene glycol) dimethyl ether and less than 1% by weight n-propanol.

Solution S-2 is applied to a polyamide substrate (Trogamid® CX7323) as an aerosol and allowed to dry (about 10-30 minutes). Once the zirconium propoxide is dry, a polysulfide sealant (PPG PR-1776M Class B Low Weight Fuel Tank Sealant) is applied to the substrate surface carrying the dried zirconium propoxide using an extrusion gun or a spatula. The sealant is allowed to cure at room temperature.

Example 3 (Comparative)

Solution S-2 is added is applied to a polyamide substrate (Trogamid® CX7323) as an aerosol and allowed to dry (about 10-30 minutes). Once the zirconium propoxide is dry, a two-part, manganese dioxide cured Permapol® P-5 modified polysulfide sealant is applied to the substrate surface carrying the dried zirconium propoxide using an extrusion gun or a spatula. The sealant is allowed to cure at room temperature.

Example 4—Adhesion Tests

Table 1 below shows the results of adhesion tests on the substrate-sealant products of Examples 1-3.

invention are identified herein as particularly advantageous, it is contemplated that the present invention is not necessarily limited to these particular aspects of the invention.

Clause 1. A method for preparing a surface comprising a thermoplastic material to receive a polysulfide or polythioether sealant, the method comprising applying to the surface an activating composition consisting of a tetraalkoxide of a Group 4 metal, a complex of an alkoxide of a Group 4 metal, or a combination thereof.

Clause 2. A method for coating a surface comprising a thermoplastic material with a polysulfide or polythioether sealant, the method comprising applying to the surface an activating composition consisting of a tetraalkoxide of a Group 4 metal, a complex of an alkoxide of a Group 4 metal, or a combination thereof, and applying a polysulfide or polythioether sealant to the surface carrying the activating composition.

Clause 3. A method for adhering a polysulfide or polythioether sealant to a surface comprising a thermoplastic material, the method comprising applying to the surface an activating composition consisting of a tetraalkoxide of a Group 4 metal, a complex of an alkoxide of a Group 4 metal, or a combination thereof.

Clause 4. A method according to any one of clauses 1-3, wherein the applying activates the thermoplastic material to generate a layer of activated thermoplastic material.

Clause 5. A method according to any one of clauses 1-4 wherein the Group 4 metal is titanium or zirconium.

TABLE 1

| Test No. | Zirconium(IV) propoxide solution | Polysulfide | Solution application[1] | Exposure conditions | Average Load/ Width at Average value (20 Peaks) (lbf/in)[2] | Cohesive Failure (%)[3] |
| --- | --- | --- | --- | --- | --- | --- |
| 1 | S-1 | PPG PR-1776M | Normal | Control[4] | 41.43 | 100 |
| 2 | S-1 | PPG PR-1776M | Light | Control | 41.68 | 100 |
| 3 | S-1 | PPG PR-1776M | Light | JRF VII[5], room temperature | 39.5 | 100 |
| 4 | S-1 | PPG PR 776M | Light | 3% NaCl[6], room temperature | 44.42 | 100 |
| 5 | S-1 | PPG PR-1776M | Heavy | Control | 45.72 | 100 |
| 6 | S-1 | PPG PR-1776M | Heavy | JRF VII, room temperature | 41.35 | 100 |
| 7 | S-1 | PPG PR-1776M | Heavy | 3% NaCl, room temperature | 46.88 | 100 |
| 8 | S-2 | PPG PR-1776M | Heavy | Control | 2.81 | 0 |
| 9 | S-2 | PPG PR-1776M | Light | Control | 0 | 0 |
| 10 | S-2 | PPG PR-1776M | Heavy | Control | 36.28 | 10-100 |
| 11 | S-2 | PPG PR-1776M | Heavy | Control | 18.74 | 0-80 |
| 12 | S-2 | PPG PR-1776M | Normal | Control | 0 | 0 |
| 13 | S-2 | PPG PR-1772 | Heavy | Control | 17.96 | 45-85 |
| 14 | S-2 | PPG PR-1772 | Light | Control | 7.90 | 0-50 |

[1]Light indicates surface just wetted; normal indicates surface was evenly wetted without any puddling; heavy indicates puddling occurred. All application levels evaporate very quickly.
[2]Determined using an apparatus capable of recording load on which a 1 inch strip of sealant is peeled from the substrate to a length of approximately 4 inches. The average load is calculated as the arithmetic mean of the highest 20 peaks in the load measurement during the peel. See SAE specification AS5127/1, subheading "Peel Strength Properties"
[3]Indicated as percentage of sealant peeling away from sealant during Average Load test. Values less than 100% indicate sealant is not adhering to the substrate, i.e., the sealant is peeling off the substrate revealing substrate. If sealant is peeling off the substrate and patches of substrate and sealant are both evident, the cohesive failure percentage indicates the amount of sealant surface coverage after completion of Average Load test.
[4]Maintained at 75 +/− 3° C. and ambient relative humidity of 50% +/− 10% RH
[5]Sample immersed in a solution containing approximately 59% cyclohexane, 30% toluene, 10% 2,2,4-trimethylpentane, and less than 1% of each of di-t-butyl disulfide and 2-methyl-2-propanethiol (all percentages by weight)
[6]Sample immersed in 3% by weight aqueous sodium chloride (NaCl in deionized water)

Having described the invention in detail and by reference to specific examples thereof, it will be apparent that modifications and variations are possible without departing from the scope of the invention defined in the appended claims. More specifically, although some aspects of the present Clause 6. A method according to any one of clauses 1-4, wherein the tetraalkoxide of a Group 4 metal, a complex of an alkoxide of a Group 4 metal, or combination thereof is an alkyltitanate, alkyltitanate complex, alkylzirconate, alkylzirconate complex, or a combination thereof, and the tetraalkoxide or complex is dissolved in an alcohol at a weight percentage of from about 12 to about 40 based on the weight of the composition.

Clause 7. A method according to any one of clauses 1-4, wherein the Group 4 metal is zirconium and the tetraalkoxide is dissolved in an alcohol corresponding to the alkoxide.

Clause 8. A method according to any one of clauses 1-4, wherein the activating composition consists of a solution of tetra-n-propylzirconate in n-propanol.

Clause 9. A method according to any one of clauses 1-4, wherein the activating composition comprises a solution of tetra-n-propyltitanate in n-propanol.

Clause 10. A method according to any one of clauses 1-4, wherein the Group 4 metal is zirconium and the tetraalkoxide is dissolved in an alcohol corresponding to the alkoxide at a weight percentage of from about 12 to about 40 percent based on the weight of the composition.

Clause 11. A method according to any one of clauses 1-4, wherein the activating composition is a solution consisting of from about 12 to about 40 weight percent tetra-n-propylzirconate in n-propanol based on the weight of the composition.

Clause 12. A method according to any one of clauses 1-4, wherein the activating composition is a solution consisting of from about 12 to about 40 weight percent tetra-n-propyltitanate in n-propanol based on the weight of composition.

Clause 13. A method according to any one of clauses 1-12, wherein the thermoplastic material is a thermoplastic polyurethane or a thermoplastic epoxy.

Clause 14. A method according to any one of clauses 1-4, further comprising applying a polysulfide sealant to the thermoplastic material.

Clause 15. A device comprising a surface comprising a thermoplastic material, a coating on the surface, and a layer of at least one polysulfide or polythioether covering the coating,
wherein the coating consists of a layer of an activated thermoplastic material, and the layer has been activated by an activating composition consisting of a tetraalkoxide of a Group 4 metal, a complex of an alkoxide of a Group 4 metal, or a combination thereof.

Clause 16. A device according to clause 15 wherein the thermoplastic material is a thermoplastic polyurethane or a thermoplastic epoxy.

Clause 17. A device according to clause 15 wherein the Group 4 metal is titanium or zirconium.

Clause 18. A device according to clause 15, wherein the tetraalkoxide of a Group 4 metal, a complex of an alkoxide of a Group 4 metal, or combination thereof is an alkyltitanate, alkyltitanate complex, alkylzirconate, alkylzirconate complex, or a combination thereof.

Clause 19. A device according to clause 15, wherein the activating composition consists of a solution of 12 to 40 weight percent tetra-n-propylzirconate in n-propanol.

Clause 20. A device according to clause 15, wherein the activating composition is a solution of about 20-25% by weight tetra-n-propylzirconate in n-propanol.

Clause 21. A method for preparing a surface comprising thermoset material to receive a polysulfide or polythioether sealant, the method comprising applying to the surface an activating composition consisting of a tetraalkoxide of a Group 4 metal, a complex of an alkoxide of a Group 4 metal, or a combination thereof.

What is claimed is:

1. A method for adhering a polysulfide or polythioether sealant to a surface comprising a thermoplastic material selected from the group consisting of polyolefins, polycarbonates, polyacrylates, polyamides, polyetherimides, polyaryletherketones, epoxies, polyimides, polyamide-imides, polyether imides, and perfluoro-alkoxy alkanes, the method consisting of
applying to the surface an activating composition consisting of a solution of a tetraalkoxide of a Group 4 metal, a complex of an alkoxide of a Group 4 metal, or a combination thereof in an alcohol;
allowing the composition to dry on the surface;
optionally mechanically treating the thermoplastic material before or after applying the activating composition; and
applying a polysulfide or polythioether sealant to the surface.

2. A method for coating a surface comprising a thermoplastic material with a polysulfide or polythioether sealant wherein the thermoplastic material is selected from the group consisting of polyolefins, polycarbonates, polyacrylates, polyamides, polyetherimides, polyaryletherketones, epoxies, polyimides, polyamide-imides, polyether imides, and perfluoro-alkoxy alkanes, the method consisting of
applying to the surface an activating composition consisting of a solution of a tetraalkoxide of a Group 4 metal, a complex of an alkoxide of a Group 4 metal, or a combination thereof in an alcohol,
optionally mechanically treating the thermoplastic material before or after applying the activating composition; and
applying a polysulfide or polythioether sealant to the surface carrying the activating composition.

3. A method according to claim 1, wherein the applying activates the thermoplastic material to generate a layer of activated thermoplastic material.

4. A method according to claim 1 wherein the Group 4 metal is titanium or zirconium.

5. A method according to claim 1, wherein the tetraalkoxide of a Group 4 metal, a complex of an alkoxide of a Group 4 metal, or combination thereof is an alkyltitanate, alkyltitanate complex, alkylzirconate, alkylzirconate complex, or a combination thereof, and the tetraalkoxide or complex is dissolved in the alcohol at a weight percentage of from about 12 to about 40 based on the weight of the composition.

6. A method according to claim 1, wherein the Group 4 metal is zirconium and the alcohol is an alcohol which corresponds to the alkoxide.

7. A method according to claim 1, wherein the activating composition consists of a solution of tetra-n-propylzirconate in n-propanol.

8. A method according to claim 1, wherein the activating composition consists of a solution of tetra-n-propyltitanate in n-propanol.

9. A method according to claim 1, wherein the Group 4 metal is zirconium and the tetraalkoxide is dissolved in an alcohol corresponding to the alkoxide at a weight percentage of from about 12 to about 40 percent based on the weight of the composition.

10. A method according to claim 1, wherein the activating composition is a solution consisting of from about 12 to about 40 weight percent tetra-n-propylzirconate in n-propanol based on the weight of the composition.

11. A method according to claim 1, wherein the activating composition is a solution consisting of from about 12 to about 40 weight percent tetra-n-propyltitanate in n-propanol based on the weight of composition.

12. A method according to claim 1, wherein the thermoplastic material is a thermoplastic epoxy.

13. A method for adhering a polythioether sealant to a surface comprising a thermoplastic material selected from the group consisting of polyolefins, polycarbonates, polyacrylates, polyamides, polyetherimides, polyaryletherketones, epoxies, polyimides, polyamide-imides, polyether imides, and perfluoro-alkoxy alkanes, the method consisting of
  applying to the surface an activating composition consisting of a solution of a tetraalkoxide of a Group 4 metal, a complex of an alkoxide of a Group 4 metal, or a combination thereof in an alcohol;
  optionally mechanically treating the thermoplastic material before or after applying the activating composition; and
  applying a polythioether sealant to the surface.

14. A method according to claim 1, wherein the alkoxide is from 20 to about 35 weight percent of the activating composition.

15. A method according to claim 1, wherein the alkoxide is from 20 to about 30 weight percent of the activating composition.

16. A method according to claim 1, wherein the alkoxide is from 20 to about 25 weight percent of the activating composition.

17. A method according to claim 1, wherein the activating composition is a solution consisting of from 20 to about 35 weight percent tetra-n-propylzirconate in n-propanol based on the weight of the composition.

18. A method according to claim 1, wherein the activating composition is a solution consisting of from 20 to about 30 weight percent tetra-n-propylzirconate in n-propanol based on the weight of the composition.

19. A method according to claim 1, wherein the activating composition is a solution consisting of from 20 to about 25 weight percent tetra-n-propylzirconate in n-propanol based on the weight of the composition.

20. A method according to claim 1, wherein the activating composition is a solution consisting of from 20 to about 35 weight percent tetra-n-propyltitanate in n-propanol based on the weight of composition.

21. A method according to claim 1, wherein the activating composition is a solution consisting of from 20 to about 30 weight percent tetra-n-propyltitanate in n-propanol based on the weight of composition.

22. A method according to claim 1, wherein the activating composition is a solution consisting of from 20 to about 25 weight percent tetra-n-propyltitanate in n-propanol based on the weight of composition.

23. A method according to claim 1, wherein the thermoplastic material is a polyamide.

24. A method for adhering a polysulfide or polythioether sealant to a surface consisting of a thermoplastic material selected from the group consisting of polyolefins, polycarbonates, polyacrylates, polyamides, polvetherimides, polyaryletherketones, epoxies, polyimides, polyamide-imides, polyether imides, and perfluoro-alkoxy alkanes, the method consisting of
  applying to the surface an activating composition consisting of a solution of a tetraalkoxide of a Group 4 metal, a complex of an alkoxide of a Group 4 metal, or a combination thereof in an alcohol;
  allowing the composition to dry on the surface;
  optionally mechanically treating the thermoplastic material before or after applying the activating composition; and
  applying a polysulfide or polythioether sealant to the surface.

25. A method for adhering a polysulfide or polythioether sealant to a surface comprising a thermoplastic material selected from the group consisting of polyolefins, polycarbonates, polyacrylates, polyamides, polyetherimides, polyaryletherketones, epoxies, polyimides, polyamide-imides, polyether imides, and perfluoro-alkoxy alkanes, the method consisting of
  activating the thermoplastic material to generate a layer of activated thermoplastic material, wherein the activating comprises applying to the thermoplastic material an activating composition consisting of a solution of a tetraalkoxide of a Group 4 metal, a complex of an alkoxide of a Group 4 metal, or a combination thereof in an alcohol;
  allowing the composition to dry;
  optionally mechanically treating the thermoplastic material before or after applying the activating composition; and
  applying a polysulfide or polythioether sealant to the surface.

26. A method for adhering a polysulfide or polythioether sealant to a surface comprising a thermoplastic material selected from the group consisting of polyolefins, polycarbonates, polyacrylates, polyamides, polyetherimides, polyaryletherketones, epoxies, polyimides, polyamide-imides, polyether imides, and perfluoro-alkoxy alkanes, the method consisting of
  activating the thermoplastic material to generate a layer of activated thermoplastic material, wherein the activating comprises applying to the thermoplastic material an activating composition consisting of a solution of tetra-n-propylzirconate in n-propanol;
  allowing the composition to dry;
  optionally mechanically treating the thermoplastic material before or after applying the activating composition; and
  applying a polysulfide or polythioether sealant to the surface.

* * * * *